(12) United States Patent
Feiertag et al.

(10) Patent No.: US 8,072,701 B2
(45) Date of Patent: Dec. 6, 2011

(54) POSITIONING APPARATUS FOR AN OPTICAL ELEMENT

(75) Inventors: Carsten Feiertag, Hungen (DE); Günter Pfeiffer, Gladenbach (DE)

(73) Assignee: Oculus Optikgeraete GmbH, Wetzlar-Dutenhofen (DE)

( * ) Notice: Subject to any disclaimer, the term of this patent is extended or adjusted under 35 U.S.C. 154(b) by 55 days.

(21) Appl. No.: 12/407,265

(22) Filed: Mar. 19, 2009

(65) Prior Publication Data

US 2009/0237814 A1 Sep. 24, 2009

(30) Foreign Application Priority Data

Mar. 20, 2008 (DE) .................... 20 2008 004 018 U

(51) Int. Cl.
*G02B 7/02* (2006.01)
*G02B 21/00* (2006.01)
(52) U.S. Cl. .................... 359/822; 359/381; 359/656
(58) Field of Classification Search .................. 359/368, 359/379–381, 656–661, 811, 813, 814, 819, 359/822–826

See application file for complete search history.

(56) References Cited

U.S. PATENT DOCUMENTS

| | | | | |
|---|---|---|---|---|
| 3,514,190 | A * | 5/1970 | Williams, Jr. et al. | 359/801 |
| 5,249,082 | A * | 9/1993 | Newman | 359/813 |
| 5,793,524 | A * | 8/1998 | Luloh | 359/381 |
| 6,733,128 | B2 | 5/2004 | Kirchhuebel | |
| 6,842,299 | B2 | 1/2005 | Duon et al. | |
| 6,943,942 | B2 * | 9/2005 | Horiguchi et al. | 359/381 |
| 7,289,282 | B2 * | 10/2007 | Matsushima | 359/819 |
| 7,529,046 | B2 | 5/2009 | Schletterer et al. | |
| 2002/0163741 | A1 * | 11/2002 | Shibazaki | 359/819 |
| 2004/0036989 | A1 | 2/2004 | Duon et al. | |
| 2007/0201151 | A1 | 8/2007 | Schletterer et al. | |

FOREIGN PATENT DOCUMENTS

| | | |
|---|---|---|
| DE | 20017891 U1 | 2/2001 |
| DE | 10139805 C1 | 10/2002 |
| DE | 102004018656 A1 | 11/2005 |
| DE | 60306451 T2 | 2/2007 |
| DE | 102006021796 A1 | 4/2007 |

* cited by examiner

*Primary Examiner* — Darryl J Collins

(74) *Attorney, Agent, or Firm* — Fredrikson & Byron, P.A.

(57) ABSTRACT

The present invention relates to a positioning apparatus (10) of a positioning unit for positioning an optical device of the positioning unit comprising at least one optical element in the ray path of a microscope in front of an eye to be observed, wherein the positioning apparatus comprises a carrier device (11) for coupling the positioning apparatus to the microscope and a holding apparatus (12) for holding the optical element, whereby the holding apparatus comprises holding devices (20) for connection of the optical device to the holding apparatus which are configured in such a manner that a distance space (24) is formed between the optical device and the holding apparatus.

19 Claims, 1 Drawing Sheet

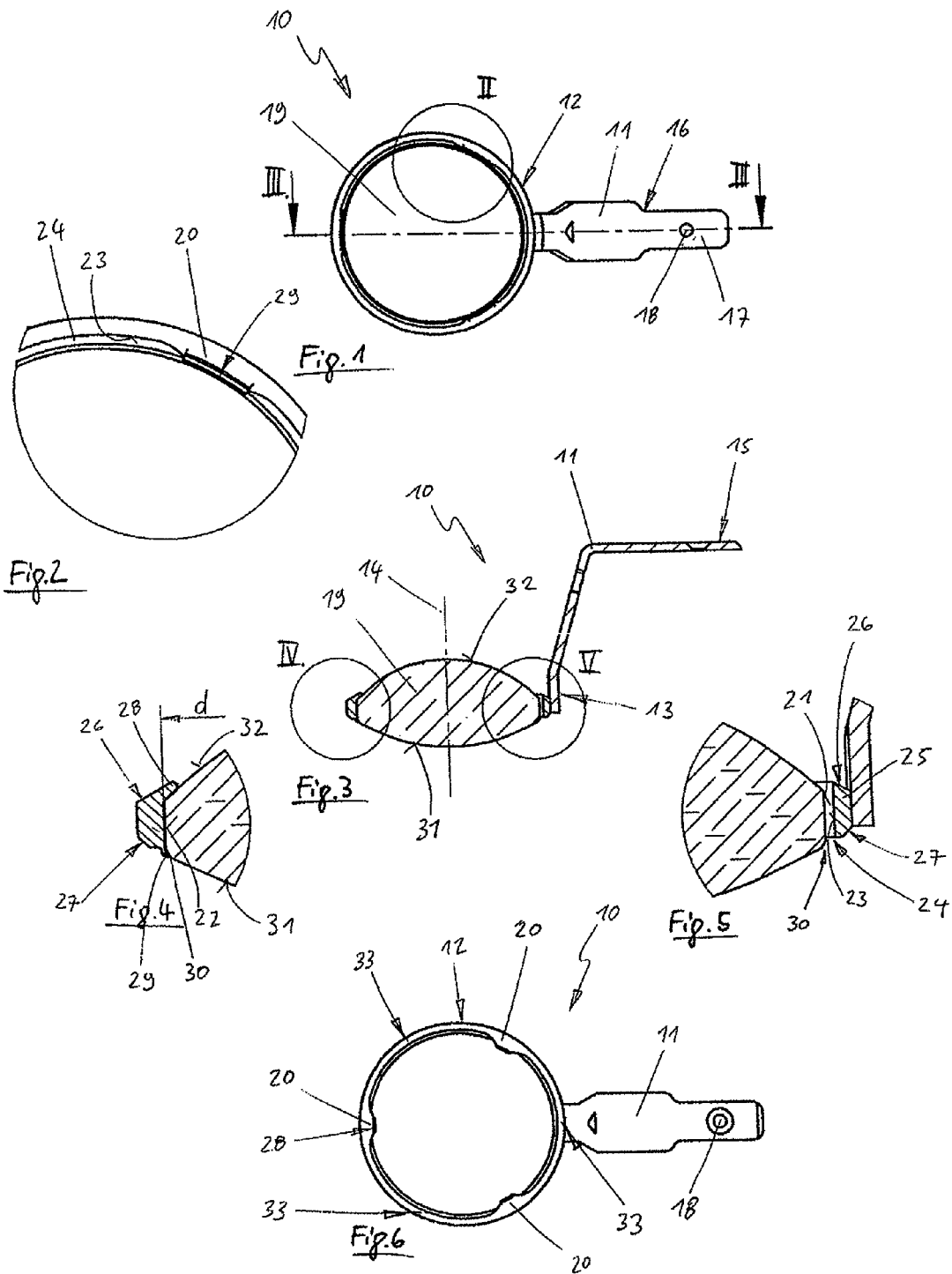

POSITIONING APPARATUS FOR AN OPTICAL ELEMENT

RELATED APPLICATIONS

This application claims priority to German Utility Model Application No. 20 2008 004 018.3 filed Mar. 20, 2008, the teachings of which are incorporated herein by reference.

The invention relates to a positioning apparatus of a positioning unit for positioning an optical device of the positioning unit, comprising at least one optical element in the ray path of a microscope in front of an eye to be observed, wherein the positioning apparatus comprises a carrier device for coupling the positioning apparatus to the microscope and a holding apparatus for holding the optical device.

Positioning apparatus of the type specified initially are used in particular for holding an optical element such as, for example, a lens, a filter disk or the like or also a combination of a plurality of elements in an optical device in the ray path in front of the objective of a microscope. Such auxiliary optics are regularly used on microscopes for examining the eye and are used, for example, for wide-angle viewing of the eye or the fundus of the eye. These auxiliary optics are frequently connected to the microscope by means of pivoting or adjusting mechanisms for pivoting the auxiliary optic into a ray path or for image focusing.

An auxiliary optic on a microscope is known, for example, from DE 200 17 891 U1 which discloses an auxiliary optic configured as a so-called ophthalmoscopic lens on a microscope. The ophthalmoscopic lens is used in particular by an operating surgeon in an eye operation for wide-angle viewing of the eye, wherein an image plane to be observed can be focused with the aid of a positioning unit and the ophthalmoscopic lens can be pivoted into the ray path of the microscope as desired. Furthermore, the ophthalmoscopic lens is held in a mounting with a carrier device, wherein the carrier device can be separated from the remaining component groups of the positioning device for sterilisation.

When using auxiliary optics within the scope of eye operations, endolaser applications or the like, it is necessary to sterilise or clean these auxiliary optics together with the directly related components by, for example, autoclaving or other known methods to avoid any infection or contamination of the eye to be treated.

The auxiliary optics known from the prior art are substantially formed from a mounting with at least one optical element inserted therein. In order to achieve a seal of the optical element with respect to the mounting, sealing rings are used inter alia, these being responsible for a larger construction of the mounting and difficult-to-clean transitions between mounting and optical element. Even when the optical element is glued into a comparatively thin mounting, there is the problem that bacteria or contaminants can penetrate into the transitions and the intermediate spaces between the mounting and the optical element and these cannot be removed during cleaning or sterilisation. The use of an adhesive is also problematical since this proves to be unresistant or generally difficult to process in particular with respect to the temperature loading during autoclaving or chemical disinfectants.

It is therefore the object of the present invention to provide a positioning apparatus for an optical device which allows simple cleaning of the positioning apparatus and largely prevents deposition or permanent penetration of contaminants.

This object is achieved by an apparatus having the features of claim 1.

The positioning apparatus according to the invention has a carrier device for coupling the positioning apparatus to the microscope and a holding apparatus for holding the optical device, wherein the holding apparatus has holding devices for connecting the optical device to the holding apparatus which are configured in such a manner that a distance space is formed between the optical device and the holding apparatus.

The positioning apparatus can thus be connected so simply via the carrier device to the positioning unit and thus to the microscope for holding and positioning the optical device. The holding of the optical device is effected merely by the holding apparatus, wherein the distance space formed between the optical device and the holding apparatus by means of the holding devices arranged relative to one another largely prevents any permanent penetration of contaminants or bacteria between optical element and holding apparatus since the transition zones and intermediate spaces between the optical device and the holding apparatus known from the prior art are minimised to the required dimension by the distance space. A distance space configured in such a manner between the optical device and holding apparatus also ensures efficient cleaning since, for example, liquid or mechanical cleaning agents such as brushes or the like, can easily penetrate into the distance space or vapour can flow efficiently through the distance space. For achieving the object of the invention, it is therefore found to be particularly advantageous if the distance space between holding apparatus and optical device is made to be as large as possible compared to the holding device for connecting the optical device to the holding apparatus without, however, a view of the operating surface through the positioning apparatus onto the eye to be examined being intolerably restricted by the positioning apparatus and nevertheless ensuring sufficiently stable fixing of the optical device in the holding apparatus.

In one embodiment the holding apparatus can comprise at least three holding devices for connecting the holding apparatus to the optical device. The optical device can thus be centred easily inside the holding apparatus, particularly when the holding devices are arranged equidistantly to one another. A fixing of the optical element at three holding points can also ensure a secure positioning of the optical device relative to the holding apparatus without further holding devices being necessary.

It is found to be particularly advantageous if the distance space is a gap. Even a comparatively narrow gap between holding apparatus and optical device can prevent any permanent penetration of contaminants since such a gap can nevertheless be thoroughly cleaned, for example, with a brush, a paint brush or the like and is also accessible for fluid cleaning media. Furthermore, the external dimensions of the holding apparatus which possibly restrict the viewing area of the operating surface can be further minimised.

If the holding devices embrace a circumferential surface of the optical device in the axial direction, the optical device can be fixed in the holding apparatus such that any axial movement of the optical device relative to the holding apparatus is prevented. Such a fixing can be configured to be straight, sloping, irregular or running round to a point independently of the configuration of a circumferential surface.

The holding devices can also form lugs which embrace at least one outer edge of the optical device in such a manner that the optical device is connected positively to the holding apparatus. A particularly simple bordering of the optical device can thus be formed by means of the lugs. The lugs can be configured in different thicknesses and can be rigid or bendable in such a manner that, for example, the optical device can be inserted in the holding apparatus and fixed positively due to permanent deformation of the lugs.

In one embodiment, the holding devices can form projections, wherein the projections engage in recesses on the circumference of the optical device in such a manner that the optical device is connected positively to the holding apparatus. The projections can, for example, taper in the direction of the optical device and form an edge or tip which engages in a recess in the optical elements, for example an at least partially peripheral notch, a hole, a milling or the like. A secure fixing of the optical device can also be achieved with such a holder.

A particularly simple structure of a holding apparatus is obtained if the holding devices are formed by the holding apparatus. In particular, the number of components to be used for the holding apparatus can thus be reduced.

Further advantageous embodiments of the holding devices are the subject matter of the further dependent claims.

It is furthermore advantageous if the holding apparatus is formed in one piece. The holding apparatus can then be formed as a single component with the result that particularly easy cleaning of the holding apparatus is possible since no further contact faces exist between components of the holding apparatus in which contaminants could be deposited.

In a further embodiment, the holding apparatus can encompass the optical device at least along half its circumference. The surface of the holding apparatus exposed to contaminants can thus advantageously be minimised. Furthermore, a field of view of an operating surface is less perturbingly influenced by the holding apparatus.

The holding apparatus can also completely encompass the optical device along its circumference, in which case complete encompassing ensures even more secure bordering of the optical device. Damage to the optical device by external mechanical effects can also be avoided by means of this bordering.

In a further embodiment the holding apparatus can be configured as a ring. A ring is particularly easy to manufacture, in which case a further advantage is obtained for the holder if the optical device has an external contour matched to the ring shape.

Contact faces are formed in sections between a circumferential face of the optical device and the holding devices. An immovable fixing of the optical device relative to the holding apparatus can thus be ensured by means of the contact faces. In addition to a positive accommodation of the optical device, an exclusive or additional non-positive accommodation of the optical device can thus also be achieved.

In one embodiment, point contact faces can be formed between the optical device and the holding device. Point contact faces particularly advantageously make it possible to minimise the overall contact area and thus reduce the size of transition zones and intermediate spaces between the optical device and the holding devices which would be suitable for accommodating contaminants.

It has proved to be particularly advantageous if the holding apparatus is at least partially flexible in the radial direction in such a manner that the optical device can be received by the holding apparatus by a deformation of said holding apparatus. If the holding apparatus is made, for example, from a comparatively thin material, a deformation of the holding apparatus in which the holding devices are moved outwardly in the radial direction can form a receiving space in which the optical device can be inserted. After inserting the optical device in the holding apparatus, the deformation can be reversed by the restoring forces of the material of the holding apparatus and the optical device thus fixed positively and/or non-positively in the holding apparatus. Such a configuration of the holding apparatus allows easy mounting and dismounting of the optical device with secure fixing at the same time.

For this type of accommodation of the optical device, the holding apparatus can completely or only partially embrace the optical device along its circumference.

Furthermore, the carrier device which connects the holding apparatus to further assemblies of the microscope can be configured as sheet metal or bar. A carrier device configured in such a simple manner has few geometric transitions which would be suitable for accommodating contaminants. The field of view of an operating surgeon is also little restricted by the carrier device.

The optical device can be fixed particularly well in the holding apparatus if the optical device is a lens. In addition to lenses, however, prisms, filters or other optically effective elements or assemblies can also be fixed in the holding apparatus.

In further embodiments of a positioning apparatus, the holding apparatus and/or the carrier device can consist of metal, wherein the carrier device can also be formed on the holding apparatus, for example. Metals are particularly suitable because of their resistance to cleaning in rinsing machines, disinfectors and to sterilisation in autoclaves.

A preferred embodiment of the invention is explained in detail hereinafter with reference to the appended drawing.

In the figures:

FIG. 1 shows an embodiment of a positioning apparatus viewed from below;

FIG. 2 shows a detailed view of the positioning apparatus according to the section II from FIG. 1;

FIG. 3 shows a sectional view of the positioning apparatus according to the line III-III from FIG. 1;

FIG. 4 shows a detailed view of the positioning apparatus according to the section IV from FIG. 3;

FIG. 5 shows a detailed view of the positioning apparatus according to the section V from FIG. 3;

FIG. 6 shows a plan view of the positioning apparatus.

A combined view of FIGS. 1 to 6 shows an embodiment of a positioning apparatus 10 comprising a carrier device 11 and a holding apparatus 12. The carrier device 11 is connected to the holding apparatus 12 by means of a connecting method not shown in detail here such as, for example, soldering or welding at its lower end 13. The carrier device 11 is further made of a flat material and is bent outwards relative to an optic axis 14 of a microscope and in its further course, in a horizontal plane at right angles to the optic axis 14. An upper end 15 of the carrier device 11 has a tapering 16 which forms a connecting region 17 for connecting the positioning apparatus 10 to a positioning unit of the microscope not shown here. The connecting region 17 can thus be inserted into a receptacle not shown here, in the manner of a plug connection. Also provided in the connecting region 17 is a through hole 18 for fastening the positioning apparatus 10 to the aforesaid positioning unit of the microscope. The fastening can be effected, for example, by means of a screw connection or a ball locating connection.

The holding apparatus 12 accommodates a lens 19, the holding apparatus 12 forming three equidistantly arranged holding devices 20. The holding devices 20 are connected directly to the lens 19 and fix the lens 19 positively in the holding apparatus 12, the holding devices 20 forming contact faces 22 adapted to a circumferential face 21 of the lens 19 in sections. The holding devices 20 are configured in such a manner that a distance space 24 is formed between the remaining circumferential face 21 of the lens 19 and an inner face 23 of the holding apparatus 12. The distance space 24 prevents any permanent penetration of contaminants into the distance space 24 or between lens 19 and holding apparatus 12 and in addition makes simple and efficient cleaning of this area possible. The holding apparatus 12 is accordingly configured to be circular like the lens 19 and has a comparatively thin, rectangular cross-sectional area 25 with external bevels 26 and 27. Since as shown here, gluing or sealing of the lens 19 in or with the holding apparatus 12 can be dispensed with here, the cross-sectional area 25 or the holding apparatus 12 can be particularly thin so that a field of view of an operating surgeon, passing by the lens 19, not shown here, is particularly little restricted by the holding apparatus 12.

The holding devices 20 further comprise lugs 28 and 29, the lugs 28 being formed in the extension of the bevel 26 and being comparatively thick and therefore rigid. The lugs 29, on the other hand, are comparatively thin so that the lugs 29 can be bent in the direction of the lens 19. In the exemplary embodiment shown here, a further circumferential bevel 30 is formed on the lens 19, against which the lugs 29 abut without an optically effective surface 31 being covered by the lugs 29. One surface 32 of the lens 19 on the other hand comes to abut with the lugs 28 so that overall a positive accommodation of the lens 19 in the holding apparatus 12 is obtained.

In addition, adaptation of the lens 19 in the holding apparatus 12 is made easier by the holding apparatus being at least partially flexible as a result of its comparatively thin design. Due to a force acting radially from outside on wall sections 33 of the holding apparatus 12, a diameter d described by the inner surface 23 can be expanded. In this case, the lens 19 can be inserted or accommodated particularly easily in the holding apparatus and fixed by restoring forces of the holding apparatus 12.

The invention claimed is:

1. A positioning apparatus for positioning an optical element having a circumferential face, and a first side and a second side opposite thereof, the optical element located in the ray path of a microscope comprising:
   a carrier device for coupling the positioning apparatus to a microscope; and
   a holding apparatus, the holding apparatus coupled to the carrier device for holding the optical element, the holding apparatus cooperating with holding devices for coupling the optical element to the holding apparatus the holding devices contacting only a minority of the circumferential face of the optical element and a minority of the first side of the optical element and optionally contacting at most a minority of the second side of the optical element while allowing a distance space between a majority of the circumferential face and the first and second sides of the optical element and the holding apparatus wherein the holding devices are formed by the holding apparatus and the holding apparatus is a unitary structure.

2. The positioning apparatus according to claim 1 wherein the holding apparatus comprises at least three holding devices for coupling the holding apparatus to the optical element.

3. The positioning apparatus according to claim 1 wherein the distance space is a gap.

4. The positioning apparatus according to claim 1 wherein the holding devices embrace a circumferential surface of the optical element in the axial direction.

5. The positioning apparatus according to claim 4 wherein the holding devices form lugs which embrace at least one outer edge of the optical element in such a manner that the optical device is connected positively to the holding apparatus.

6. The positioning apparatus according to claim 1 wherein the holding devices form projections, wherein the projections engage in recesses on the circumference of the optical element in such a manner that the optical element is connected positively to the holding apparatus.

7. The positioning apparatus according to claim 1 wherein the holding devices are formed on the optical element and embrace the holding apparatus in the axial direction.

8. The positioning apparatus according to claim 1 wherein the holding devices are holding elements formed independently of the holding apparatus and the optical element and are arranged non-positively between the holding apparatus and the optical element.

9. The positioning apparatus according to claim 1 wherein the holding apparatus encompasses the optical element at least along half its circumference.

10. The positioning apparatus according to claim 1 wherein the holding apparatus completely encompasses the optical element along its circumference.

11. The positioning apparatus according to claim 1 wherein the holding apparatus is configured as a ring.

12. The positioning apparatus according to claim 1 wherein a plurality of contact faces are formed on a circumferential face of the optical element and the holding devices.

13. The positioning apparatus according to claim 1 wherein point contact faces are formed between the optical element and the holding device.

14. The positioning apparatus according to claim 1 wherein the holding apparatus is at least partially flexible in the radial direction in such a manner that the optical element can be received by the holding apparatus by a deformation of said holding apparatus.

15. The positioning apparatus according to claim 1 wherein the carrier device is formed of metal.

16. The positioning apparatus according to claim 1 wherein the carrier device is formed independently of the holding apparatus and can be connected to the holding apparatus.

17. The positioning apparatus according to claim 1 wherein the optical element is a lens.

18. The positioning apparatus according to claim 1 wherein the optical element is a prism.

19. The positioning apparatus according to claim 1 wherein the optical element is a filter disk.

* * * * *